3,256,312
ESTERS OF α-CYANO-β-ALKYL CINNAMIC ACID
Albert F. Strobel, Delmar, and Sigmund C. Catino, Castleton, N.Y., assignors to General Aniline & Film Corporation, New York, N.Y., a corporation of Delaware
No Drawing. Filed Oct. 2, 1961, Ser. No. 141,965
15 Claims. (Cl. 260—465)

This invention relates to new and useful α-cyano-β-alkyl substituted cinnamic derivatives and for processes for preparing same, and in particular to certain specific derivatives of the ester type.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

We have discovered a class of compounds which are not only compatible with a great number of film-forming plastics, resins, gums, waxes and the like, but which, further, exhibit outstanding ultra-violet absorbing properties within the ultra-violet region close to the visible spectrum, namely, in the wave length region of 3000 to 3600 A. The compounds of this invention, even though they exhibit outstanding absorbing properties close to the visible region of the electromagnetic field, nevertheless are essentially colorless compounds and can be employed with the assurance that they will not contribute to color in normally colorless formulations, nor will they affect the color of a colored formulation such as a paint film or a dyed textile.

It is therefore an object of the present invention to provide new and useful compounds characterized by outstanding ultra-violet absorbing properties.

It is a further object of this invention to provide new and useful esters of α-cyano-β-alkyl cinnamic acids.

It is a still further object of this invention to provide new and useful esters of α-cyano-β-alkyl cinnamic acids which exhibit outstanding ultra-violet absorbing properties.

It is another object of this invention to provide processes for the preparation of new and useful ultra-violet absorbing compounds.

It is still another object of this invention to provide processes for the preparation of new and useful esters of α-cyano-β-alkyl cinnamic acids.

Other objects and advantages will appear hereinafter as the description proceeds.

The new and useful compounds of this invention are characterized by the following general formula:

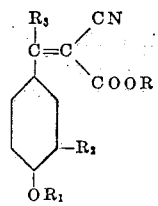

wherein $R_1$ is alkyl (including substituted alkyl), alkenyl, or aryl (including substituted aryl); $R_2$ is alkyl of 1 to about 18 carbon atoms; $R_3$ is alkyl or alkenyl of 1 to about 30 carbon atoms and R is alkyl of 1 to about 30 carbon atoms, the said compounds being devoid of nitro groups. As suitable alkyl, substituted alkyl and alkenyl groups for R, $R_1$, $R_2$, and $R_3$ there may be employed:

Methyl
Ethyl
n-Propyl
Iso-propyl
n-Butyl
Iso-butyl
Tertiary-butyl
Secondary-butyl
n-Amyl
Iso-amyl
Tertiary-amyl and the other isomeric amyls
n-Hexyl
Iso-hexyl and the other isomeric hexyls
n-Heptyl
Iso-heptyl and the other isomeric heptyls
n-Primary nonyl (nonyl-1)
    nonyl-(2)
    nonyl-(3)
    nonyl-(5)
2-methyl-octyl-2
4-ethyl-heptyl-4
2-methyl-4-ethyl-hexyl-4
n-Primaryl octyl
    octyl-(2) (capyryl)
2-methyl-3-ethyl-pentyl-3
2,2,4-trimethyl-pentyl-4
2-ethyl-hexyl-1
3-ethyl-hexyl-3
2-methyl-heptyl-2
3-methyl-heptyl-3
4-methyl-heptyl-4
n-Primary decyl (decyl-1)
Decyl-4 (secondary decyl)
2-ethyl-octyl-3 (tertiary decyl)
4-propyl-heptyl-4 (tertiary decyl)
Undecyl-1 (n-primary decyl)
Undecyl-2 (n-secondary decyl)
Dodecyl-1 (n-dodecyl)
Tridecyl-1 (n-tridecyl)

Tridecyl-7
3-ethyl-undecyl
Tetradecyl-1 (n-tetradecyl)
Pentadecyl-1 (n-pentadecyl)
Pentadecyl-8
Hexadecyl (cetyl)
Heptadecyl-9
Octadecyl-1
2-methyl heptadecyl-2
Eicosyl-1
Docosyl-1
Tricosyl-12
Tetracosyl
Tricapryl
Pentacosyl
Hexacosyl
Heptacosyl
Octacosyl
Nonacosyl
Alkenyl
Allyl (CH$_2$=CHCH$_2$—)
Methallyl (CH$_2$=C(CH$_3$)CH$_2$—)
Crotyl (CH$_3$CH=CHCH$_2$—)

butenyl-1 (CH$_2$=CH—CH—CH$_3$)
                    |

Pentenyl-1
γ-Isopropyl allyl
β-Ethyl-γ-propyl allyl
2-methyl-octenyl-6
Decenyl-1
Decenyl-2
Undecenyl
Dodecenyl-2
Octadecenyl
Docosenyl
Pentamethyl eicosenyl
Cyanoethyl
Cyanopropyl(n)
Cyanoisopropyl
Cyanobutyl(n)
Cyanoisobutyl
Cyanoamyl(n)
Cyanoisoamyl
Cyanohexyl
Cyanoheptyl
Cyanononyl
Cyanodecyl
Cyanolauryl, and the like.
Hydroxyethyl
Hydroxypropyl (n-propyl, isopropyl)
Hydroxybutyl (n-butyl, isobutyl, etc.)
Hydroxyamyl
Hydroxyhexyl
Hydroxydecyl
Hydroxylauryl, and the like.
Chloroethyl
Chloropropyl (n-propyl, isopropyl)
Chlorobutyl (n-butyl, isobutyl, etc.)
Chloroamyl
Chlorohexyl
Chlorodecyl
Chlorolauryl, and the like.
Bromoethyl
Bromopropyl (n-propyl, isopropyl)
Bromobutyl (n-butyl, isobutyl, etc.)
Bromoamyl
Bromohexyl
Bromodecyl
Bromolauryl, and the like.
Methoxyethyl
Methoxypropyl (n-propyl, isopropyl)
Methoxybutyl (n-butyl, isobutyl, etc,)
Methoxyamyl
Methoxyhexyl
Methoxydecyl
Methoxylauryl, and the like.

Ethoxyethyl
Ethoxypropyl (n-propyl, isopropyl)
Ethoxybutyl (n-butyl, isobutyl, etc.)
Ethoxyamyl
Ethoxyhexyl
Ethoxydecyl
Ethoxylauryl, and the like.
Carbomethoxy ethyl
Carbomethoxy propyl
Carbomethoxy butyl
Carbomethoxy amyl
Carbomethoxy hexyl, etc.
Carbethoxyethyl
Carbethoxypropyl
Carbethoxybutyl
Carbethoxyamyl
Carbethoxyhexyl, etc.
Carbopropoxyethyl
Carbopropoxypropyl
Carbopropoxybutyl
Carbopropoxyamyl
Carbopropoxyhexyl, etc.
Carbobutoxyethyl
Carbobutoxypropyl
Carbobutoxybutyl
Carbobutoxyamyl
Carbobutoxyhexyl, etc.
Phenoxymethyl
Phenoxyethyl
Phenoxypropyl
Phenoxybutyl
Phenoxyamyl
Phenoxyhexyl, etc.
Toloxymethyl
Toloxyethyl
Toloxypropyl
Toloxybutyl
Toloxyamyl
Toloxyhexyl, etc.
Xyloxymethyl
Xyloxyethyl
Xyloxypropyl
Xyloxybutyl
Xyloxyamyl
Xyloxyhexyl, etc.
Hydroxyethoxyethyl
Hydroxyethoxypropyl
Hydroxyethoxybutyl
Hydroxyethoxyamyl, etc.
Hydroxypropoxyethyl
Hydroxypropoxypropyl
Hydroxypropoxybutyl
Hydroxypropoxyamyl, etc.
Hydroxybutoxyethyl
Hydroxybutoxypropyl
Hydroxybutoxybutyl
Hydroxybutoxyamyl, etc.
2-chloroallyl
3-chloroallyl
3,3-dichloroallyl
2,3-dichloroallyl
2'-bromoallyl
2-iodoallyl
1-chlorobutenyl-(1)
2-chlorobutenyl-(1)
4-chlorobutenyl-(1)
4-bromobutenyl-(1)
2-chloro-4-bromobutenyl-(1)
1,2-dichloro-4-bromobutenyl-(1)
1,4-dibromobutenyl-(1)
2,4-dibromobutenyl-(1)
2-chlorcrotyl
3-chlorcrotyl
4-chlorcrotyl
2,4-dichlorocrotyl 1,2-bromocrotyl
3-chloromethallyl
3,3-dichloromethallyl
1,2-dibromopentenyl-(1)
2,3-dibromoheptenyl-(2)
Benzyl
Phenethyl, and the like As suitable aryl and substituted aryl, mention may be made of:

Phenyl
Tolyl
Xylyl
Cumyl
α-Naphthyl
β-Naphthyl
α-Anthraquinonyl
β-Anthraquinonyl
γ-Anthraquinonyl
Phenanthranyl
Diphenyl and the alkyl substituted derivatives thereof
Anisole
Penetole
p-Diethoxyphenyl
1-methoxy phenanthryl
α-Naphthylmethylether
β-Naphthylmethylether
α-Naphthylethylether
β-Naphthylethylether
Hydroxyethyl phenyl
Hydroxypropyl phenyl
Chlorophenyl
Bromophenyl
1,2-dichlorophenyl
1,3-dichlorophenyl
1,3,5-trichlorophenyl
1,2-dibromophenyl
o-Chlorotolyl
m-Chlorotolyl
m-Bromotolyl
Bromo-o-xylyl
α,β-Dichloro naphthyl
4-bromoacenaphthyl
Carboxyphenyl
Carboxytolyls
Carboxyxylyls
Carbalkoxylphenyls, e.g.,
    Carbomethoxylphenyl
    Carboethoxylphenyl
Carbalkoxytolyls, e.g.,
    Carbomethoxytolyls
Acetophenyl
Propiophenyl
Butyrophenyl
Lauroylphenyl
Stearoylphenyl
p-Acetotolyl
o-Acetotolyl
α-Benzoyl naphthyl
β-Benzoyl naphthyl
Acetaminophenyl
Acet-methylamino phenyl
o-Acetoaminotolyl
p-Acetoaminotolyl
α-Acetoaminonaphthyl
β-Acetoaminonaphthyl
Propio-aminophenyl
Butyro-aminophenyl
o-Propio-aminotolyl
p-Propio-aminotolyl
o-Butyroaminotolyl
p-Butyroaminotolyl
o-Lauroylaminotolyl
p-Lauroylaminotolyl
o-Stearolylaminotolyl
p-Stearolylaminotolyl
Sulfamyl phenyl
Sulfamyl naphthyl In addition to the above contemplated derivatives, polyoxyalkylated derivatives thereof are within the purview of this invention. Any of the aforementioned derivatives containing at least one reactive hydrogen atom may be reacted with an alkylene oxide or a compound functioning as an oxide such as ethylene oxide, propylene oxide, butylene oxide, butylene dioxide, cyclohexane oxide, glycidol, epichlorohydrin, butadiene dioxide, isobutylene oxide, styrene oxide and mixtures thereof, and the like to yield the corresponding polyoxyalkylated product. Among the types of compounds which are reactive in this manner are the following:

alcohols
amides
substituted amides
and the like

From one to about 100 moles of oxyalkylating agent may be condensed with the said alcohols and amides.

Some specific ketones are:

3'-methyl-4'-methoxy acetophenone
3'-ethyl-4'-methoxy acetophenone
3'-butyl-4'-methoxy acetophenone
3'-allyl-4'-methoxy acetophenone
4'-butoxy-3'-methyl acetophenone
4'-isopentyloxy-3'-methyl acetophenone
3'-hexyl-4'-methoxy acetophenone
3'-lauryl-4'-methoxy acetophenone
3'-methyl-4'-ethoxy acetophenone
3'-butyl-4'-ethoxy acetophenone
3'-iso-octyl-4'-ethoxy acetophenone
3'-decyl-4'-ethoxy acetophenone
3'-methyl-4'-n-propoxy acetophenone
3'-iso-amyl-4'-n-propoxy acetophenone
3'-stearyl-4'-n-propoxy acetophenone
3'-methyl-4'-phenoxy acetophenone
3'-methyl-4'-benzyloxy acetophenone
3'-methyl-4'-allyloxy acetophenone
3'-methyl-4'-methoxy-2-pentenophenone
3'-methyl-4'-methoxy-propiophenone
3'-ethyl-4'-methoxy-propiophenone
3'-n-butyl-4'-methoxy-propiophenone
3'-n-butyl-4'-n-propoxy propiophenone
3'-methyl-4'-methoxy-butyrophenone
3'-methyl-4'-ethoxy-butyrophenone
3'-methyl-4'-allyloxy-butyrophenone
3'-methyl-4'-phenoxy-butyrophenone
3'-ethyl-4'-(p-chlorobenzyloxy)-butyrophenone
3'-pentadecyl-4'-methoxy-butyrophenone
4'-methoxy-3'-methyl-α-phenyl acetophenone
4'-butoxy-3'-methyl butyrophenone
4'-isopentyloxy-3'-methyl butyrophenone The general method for preparing the compounds of this invention involves a condensation of the selected ketone with an alkylcyanoacetate in a suitable solvent and under such conditions that dehydration occurs to form the substituted cinamic acid derivative.

The following examples will serve to illustrate the present invention without being deemed limitative thereof. Parts are by weight unless otherwise indicated.

*Example 1*

Preparation of:

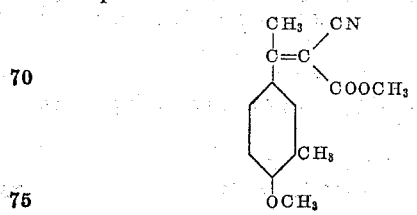

Into a 500 ml. flask fitted with a stirrer, thermometer, reflux condenser, water trap and heating mantle, there are charged:

0.25 mol 4'-methoxy-3'-methyl acetophenone
0.25 mol methyl cyanoacetate
3.85 g. ammonium acetate
12 ccs. glacial acetic acid
175 ccs. benzene The charge is stirred for 8 hours at reflux and then the benzene is distilled. The residue is diluted with 130 mls. water and filtered. The solid residue is slurried in 85 mls. of water and filtered again. The residue is then distilled under a high vacuum of 0.6 mm. to remove volatile impurities. The residue is fairly pure product.

*Example 2*

Preparation of:

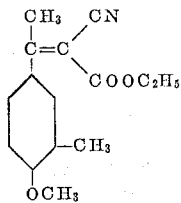

Example 1 is repeated except that 0.25 mol of ethylcyanoacetate is used in place of the methyl ester.

*Example 3*

Preparation of:

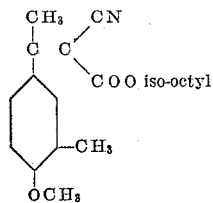

Example 1 is repeated employing the 2-ethyl hexyl (isooctyl) ester in place of the methyl cyanoacetate.

*Example 4*

Preparation of:

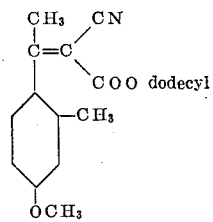

Example 1 is again repeated using dodecyl α-cyanoacetate.

*Example 5*

Preparation of:

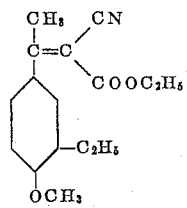

This compound is prepared similarly as the one of Example 2 except that the ketone used is 3'-ethyl-4'-methoxy acetophenone.

*Example 6*

Examples 1 through 4 are repeated employing as the ketone the following:

A. 3'-butyl-4'-methoxy acetophenone
B. 3'-n-hexyl-4'-methoxy acetophenone
C. 3'-isooctyl-4'-ethoxy acetophenone
D. 3'-methyl-4'-n-propoxy acetophenone
E. 3'-stearyl-4'-n-propoxy acetophenone
F. 3'-methyl-4'-phenoxy acetophenone
G. 3'-methyl-4'-benzyloxy acetophenone
H. 3'-methyl-4'-allyloxy acetophenone
I. 3'-methyl-4'-methoxy propiophenone
J. 3'-methyl-4'-phenoxy butyrophenone
K. 4'-methoxy-3'-methyl-α-phenyl acetophenone
L. 4'-hydroxyethoxy-3'-methyl acetophenone

*Example 7*

The condensation product of the ketone of 6L with ethyl cyanoacetate is ethoxylated by adding to 1 mol thereof 1.2% by weight based on the weight thereof of potassium hydroxide and thereafter adding 4.5 mols of ethylene oxide while maintaining the mixture in an autoclave. The resultant product contains an average of 4.5 oxyethylene groups.

*Example 8*

The procedure of Example 7 is repeated employing the following oxyalkylating agents and amounts thereof:

(1) 6 mols ethylene oxide
(2) 10 mols ethylene oxide
(3) 20 mols ethylene oxide
(4) 50 mols ethylene oxide
(5) 100 mols ethylene oxide
(6) 8 mols propylene oxide
(7) 30 mols propylene oxide
(8) 75 mols propylene oxide
(9) 8 mols propylene oxide above plus 12 mols ethylene oxide

*Example 9*

The product of Example 1 is incorporated into a nitrocellulose lacquer which consists of the following:

20%:
  46 parts of 1.2 sec. nitrocellulose
  4 parts product of Example 1
  35 parts Cellolyn 502 (non-drying plasticizing alkyd resin of Hercules Powder Company)
  15 parts dibutyl phthalate 80% of a mixture of:
  35 parts butyl acetate
  15 parts butenol
  50 parts toluene This lacquer is drawn out on a metal plate with a Bird film applicator to give a film of 3 mils in thickness. A similar film is prepared wherein the product of Example 1 is replaced by 4 parts of ½ sec. nitrocellulose. The film without the ultra-violet absorber develops a distinct yellow color upon prolonged exposure to light whereas the film containing the absorber shows no change.

*Example 10*

Example 9 is repeated using the compound of Example 2.

*Example 11*

0.5 g. of the product of Example 3 is melted together with 9.5 g. of polyethylene wax PT 95504 (Semet-Solvay) at 120° C. to give a solution. The material is then pressed out in a Carver press to give a film of about 0.03 inch thickness. The film gives excellent protection to meat.

*Example 12*

0.4 g. of the product of Example 5 is added to a cellulose acetate composition comprising 35 g. ethanol, 6.5 g. Methyl Cellosolve, 9.0 g. ethyl acetate and 26.0 g. of cellulose acetate dope (5 g. cellulose acetate in 21 g. acetone). A film is formed in the usual manner and is found to be of outstanding stability to food materials stored behind it when exposed to ultra-violet light.

Example 13

Application of the product of Example 3 to foamed polyvinyl chloride:

A 5% solution of product of Example 3 in Methyl Cellosolve is prepared. A sponge of polyvinyl chloride foam is immersed in the solution. The foam is prepared from the following formulation:

| | Parts |
|---|---|
| Marvinol VR-10 (polyvinyl chloride resin—U.S. Rubber Co.) | 100.0 |
| Di-2-ethylhexyl phthalate | 130.0 |
| Barium cadmium stabilizer (Advance BC-105) | 3.5 |
| Celogen p,p'-oxybis(benzenesulfonyl hydroxide) | 25.0 |

The sponge is removed from the solution and squeezed free of residual solvent, and then dried in vacuo. The sponge is exceptionally stable to ultra-violet light.

The compounds of this invention are in general soluble in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 mols per mol of reactive hydrogen containing compound, range from soluble to extremely soluble in water, the solubility increasing as the number of oxyalkyl groups are increased.

The amount of stabilizer to be incorporated in the composition to be stabilized is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet absorbers of this invention can be used not only to stabilize clear films, plastics and the like, but they may be employed in opaque, semi-opaque or translucent materials, the surface of which is susceptible to degradation by ultra-violet light. Among such different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, or translucent. The compounds of this invention give outstanding protection to paint, enamel and varnish films against fading of pigments and dyes contained therein. The most outstanding and significant achievement of the compounds of this invention lies in the remarkable ability of these compounds to protect and stabilize polyoxymethylene, polyethylene, polypropylene, and vinyl halide and homopolymers, copolymers, interpolymers and graft copolymers of these and especially outstanding results are achieved with polyvinyl chloride and vinyl chloride copolymers against ultra-violet light degradation. The compounds of this invention have been found to be at least five times as effective in such stabilizing situations as the heretofore employed hydroxybenzophenones known for such uses.

The compounds of the present invention have also been found to be admirably suited for incorporation into the transparent packings of the various pressure sensitive type adhesive tapes presently in common use. By the employment of these compounds in such a manner, the adhesive nature of the pressure sensitive adhesive is remarkably preserved. Not only may the compounds be incorporated directly into the backing, but they may be used as an overcoating in a transparent or translucent film coating base employing as the film former, any suitable material which will adhere to the tape back. Thus, in the case of a regenerated cellulose tape, one may coat the back thereof with one of the cellulosic lacquers hereinbefore described in Example 8. For direct incorporation into a film of regenerated cellulose, one may employ any of the compounds herein disclosed, and particularly those which have been polyoxyalkylated as described, for example, in Example 8(1) through 8(5). In this instance, it is preferred to impregnate the regenerated cellulose in the gel state before final drying thereof.

Other variations in and modifications of the described processes which will be obvious to those skilled in the art can be made in this invention without departing from the scope or spirit thereof.

We claim:

1. An essentially colorless compound devoid of nitro groups of the formula:

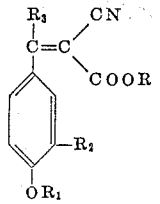

wherein R is alkyl of 1 to 30 carbon atoms, $R_2$ is alkyl of 1 to 18 carbon atoms $R_3$ is a radical selected from the group consisting of alkyl and alkenyl of 1 to 30 carbon atoms and $R_1$ is an organic radical.

2. A compound as defined in claim 1 wherein $R_3$ is alkyl.

3. A compound as defined in claim 1 wherein $R_3$ is alkenyl.

4. A compound as defined in claim 2 wherein $R_1$ is alkyl.

5. A compound as defined in claim 4 wherein $R_1$ is aralkyl.

6. A compound as defined in claim 4 wherein $R_1$ is aryl.

7. A compound as defined in claim 4 wherein $R_1$ is alkenyl.

8. A compound of the formula:

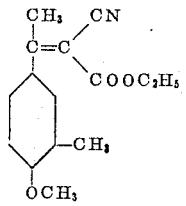

9. A compound of the formula:

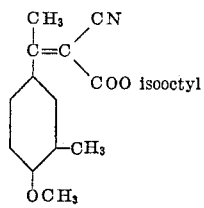

10. A compound of the formula:

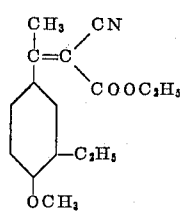

11. A compound of the formula:

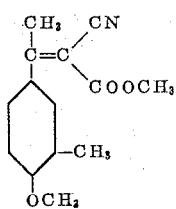

12. A compound of the formula:

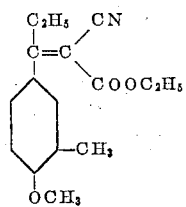

13. A compound of the formula:

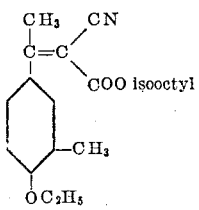

14. A compound of the formula:

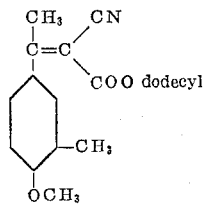

15. A compound of the formula:

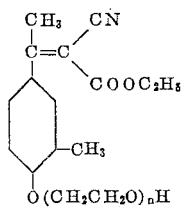

wherein $n$ is an integer from 1 to about 100.

References Cited by the Examiner

UNITED STATES PATENTS 2,465,318 3/1949 Seymour _____ 260—465
2,839,402 6/1958 Edwards et al. _____ 260—465 X

OTHER REFERENCES

Plaisted et al.: Contributions from Boyce Thompson Institute, 1955, vol. 18, pages 232–233.

CHARLES B. PARKER, *Primary Examiner.*

JOSEPH P. BRUST, DALE R. MAHANAND,
*Assistant Examiners.*